United States Patent
Li et al.

(10) Patent No.: US 7,780,464 B2
(45) Date of Patent: Aug. 24, 2010

(54) SURFACE CONTACT CARD HOLDER AND PORTABLE ELECTRONIC DEVICE USING THE SAME

(75) Inventors: Jin Li, Shenzhen (CN); Chang-Zhi Li, Shenzhen (CN)

(73) Assignees: Shenzhen Futaihong Precision Industry Co., Ltd., ShenZhen, Guangdong Province (CN); FIH (Hong Kong) Limited, Kowloon (HK)

( * ) Notice: Subject to any disclaimer, the term of this patent is extended or adjusted under 35 U.S.C. 154(b) by 0 days.

(21) Appl. No.: 12/391,350

(22) Filed: Feb. 24, 2009

(65) Prior Publication Data

US 2010/0087080 A1 Apr. 8, 2010

(30) Foreign Application Priority Data

Oct. 6, 2008 (CN) .......................... 2008 1 0304743

(51) Int. Cl.
*H01R 13/62* (2006.01)
(52) U.S. Cl. ..................................................... 439/327
(58) Field of Classification Search ................. 439/327, 439/350, 328, 159
See application file for complete search history.

(56) References Cited

U.S. PATENT DOCUMENTS

| | | | | |
|---|---|---|---|---|
| 6,976,860 | B1 * | 12/2005 | Su | 439/159 |
| 7,484,976 | B2 * | 2/2009 | Ezaki | 439/159 |
| 7,554,813 | B2 * | 6/2009 | Miller et al. | 361/737 |
| 7,566,233 | B2 * | 7/2009 | Ting | 439/159 |
| 7,597,566 | B2 * | 10/2009 | Peiker | 439/131 |
| 7,612,993 | B1 * | 11/2009 | Takei et al. | 361/679.31 |
| 7,614,891 | B2 * | 11/2009 | Yu | 439/159 |
| 7,635,276 | B1 * | 12/2009 | Chu et al. | 439/326 |
| 7,651,351 | B2 * | 1/2010 | Yen et al. | 439/159 |
| 7,658,649 | B2 * | 2/2010 | Satoh et al. | 439/630 |

* cited by examiner

*Primary Examiner*—Jean F Duverne
(74) *Attorney, Agent, or Firm*—Steven M. Reiss

(57) ABSTRACT

A holder for a surface contact card includes a main body, a cover and an impeller. The main body provides a receiving bay receiving the surface contact card therein. The cover is disposed on the main body. The cover defines an opening. The impeller is slidably received in the opening for pushing the surface contact card to remove it from the receiving bay. A portable electronic device with the holder mounted on it is also disclosed.

13 Claims, 5 Drawing Sheets

SURFACE CONTACT CARD HOLDER AND PORTABLE ELECTRONIC DEVICE USING THE SAME

BACKGROUND

1. Technical Field

The present disclosure generally relates to card use in electronic devices and, particularly, to a surface contact card holder for a portable electronic device.

2. Description of Related Art

With the development of wireless communication and information processing technologies, portable electronic devices such as mobile phones are now increasingly in widespread use. These electronic devices enable consumers to enjoy technologically enhanced convenience in a wide array of environments. Surface contact cards having special circuits are widely used in portable electronic devices to enhance or specialize the functions of the portable electronic devices. For example, a subscriber identity module (SIM) card in a mobile phone can dedicate the mobile phone' functions to the SIM card owner. By changing SIM cards, a single mobile phone can be used by many different SIM card owners as a personal phone.

Although surface contact card holders may be simple, the engagement between the surface contact card holder and the surface contact card must still allow easy disengagement of the two.

Therefore, there is room for improvement within the art.

BRIEF DESCRIPTION OF THE DRAWINGS

Many aspects of the disclosure can be better understood with reference to the following drawings. The components in the drawings are not necessarily drawn to scale, the emphasis instead being placed upon clearly illustrating the principles of the present surface contact card holder. Moreover, in the drawings, like reference numerals designate corresponding parts throughout the several views.

DETAILED DESCRIPTION OF THE EMBODIMENTS

The disclosed surface contact card holder can seat surface contact cards such as SIM cards, compact flash cards (CFs), multimedia cards (MMCs), and others. The disclosed portable electronic device, shown in the exemplary embodiment as a mobile phone, can alternatively be a PDA, camera, recorder, or other device, while remaining well within the scope of the disclosure.

Figure 1:
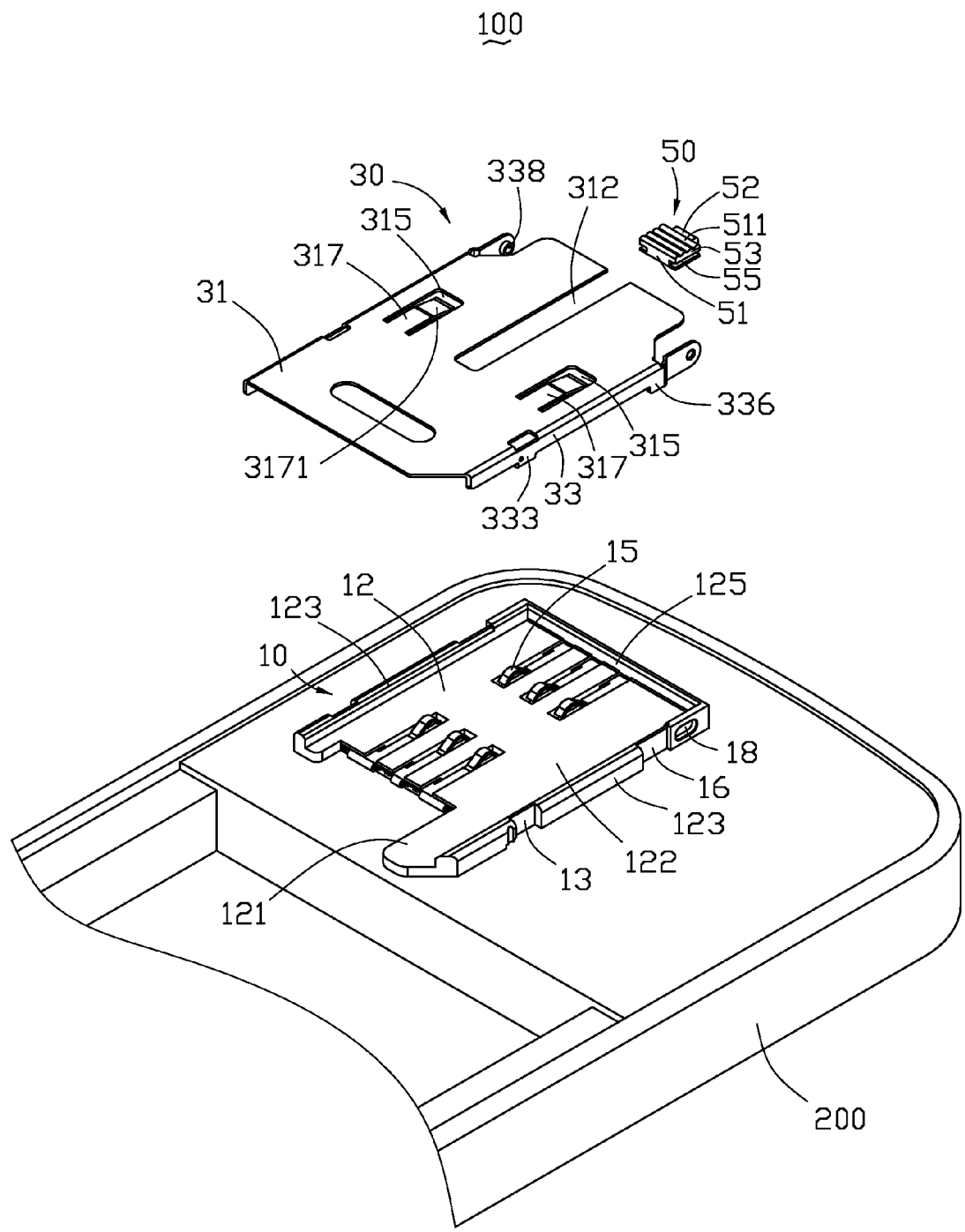
FIG. 1 is an exploded, isometric view of a surface contact card holder as disclosed, with a surface contact card, deployed on a mobile electronic device as is also disclosed, in accordance with an exemplary embodiment.
Figure 2:
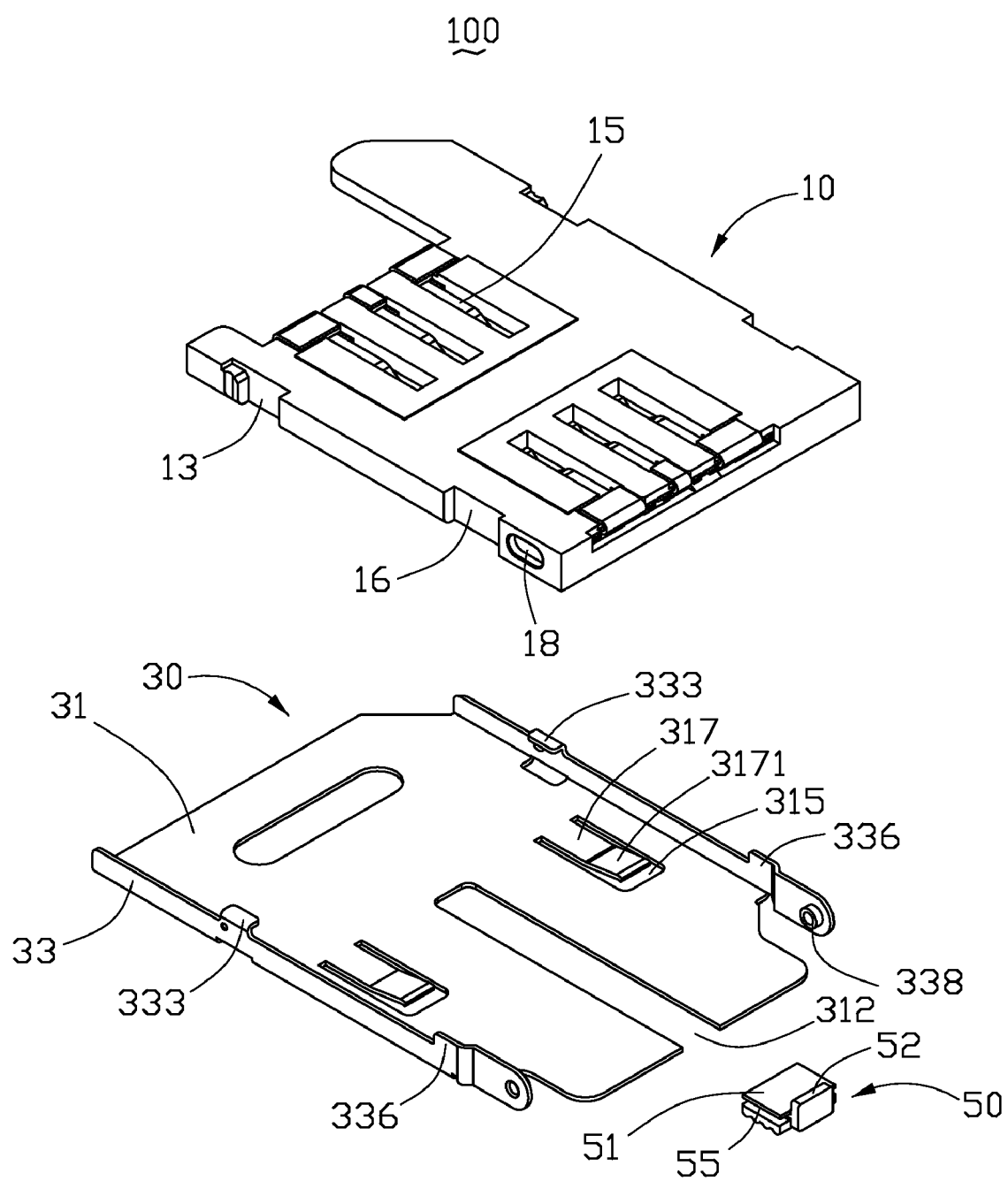
FIG. 2 is an exploded, isometric view of the surface contact card holder from another aspect viewed without the mobile phone.

Referring to FIGS. 1 and 2, the surface contact card holder 100, mounted on an electronic device 200 includes a main body 10, a cover 30 and an impeller 50. The cover 30 may be attached to the main body 10 to receive a surface contact card.

In this exemplary embodiment, the main body 10 is substantially rectangular, and mounted on the electronic device 200, here, a mobile phone. The main body 10 includes two sidewalls 123 and one end wall 125 connecting each other, thereby defining a receiving bay 12 and an open end 121. A bottom surface 122 of the receiving bay 12 positions a connector 15 with a plurality of electronic contacts for electrical contact with the surface contact card. Each sidewall 123 defines a notch 13, a guide groove 16 and a through hole 18.

The cover 30 is detachably attached to the main body 10. The cover 30 includes a baseboard 31 and two extending boards 33. The baseboard 31 defines a strip opening 312 communicating with one end thereof. The baseboard 31 defines a cutout 315 and a resisting portion 317 extending into the cutout 315 at two sides of the opening 312. Each resisting portion 317 has a bent end 3171 angling toward an inner side of the baseboard 31. Each extending board 33 forms a tab 333, a stopper block 336 and a post 338 respectively corresponding to the notch 13, the guide groove 16 and the through hole 18.

The impeller 50 is slidably received in the opening 312 of the cover 30. The impeller 50 includes a main portion 51 and a contact portion 52 integrally formed together. The main portion 51 is substantially I-shaped, and one side of the main portion 51 forms a plurality of ribs 511 contacting the main portion 51. The main portion 51 includes two side surfaces 53. Each side surface 53 defines a slot 55 for slidably receiving the baseboard 31 at two sides of the opening 312. The contact portion 52 is positioned at one end of the main portion 51. One side of the contact portion 52 projects higher than the main portion 51.

Figure 3:
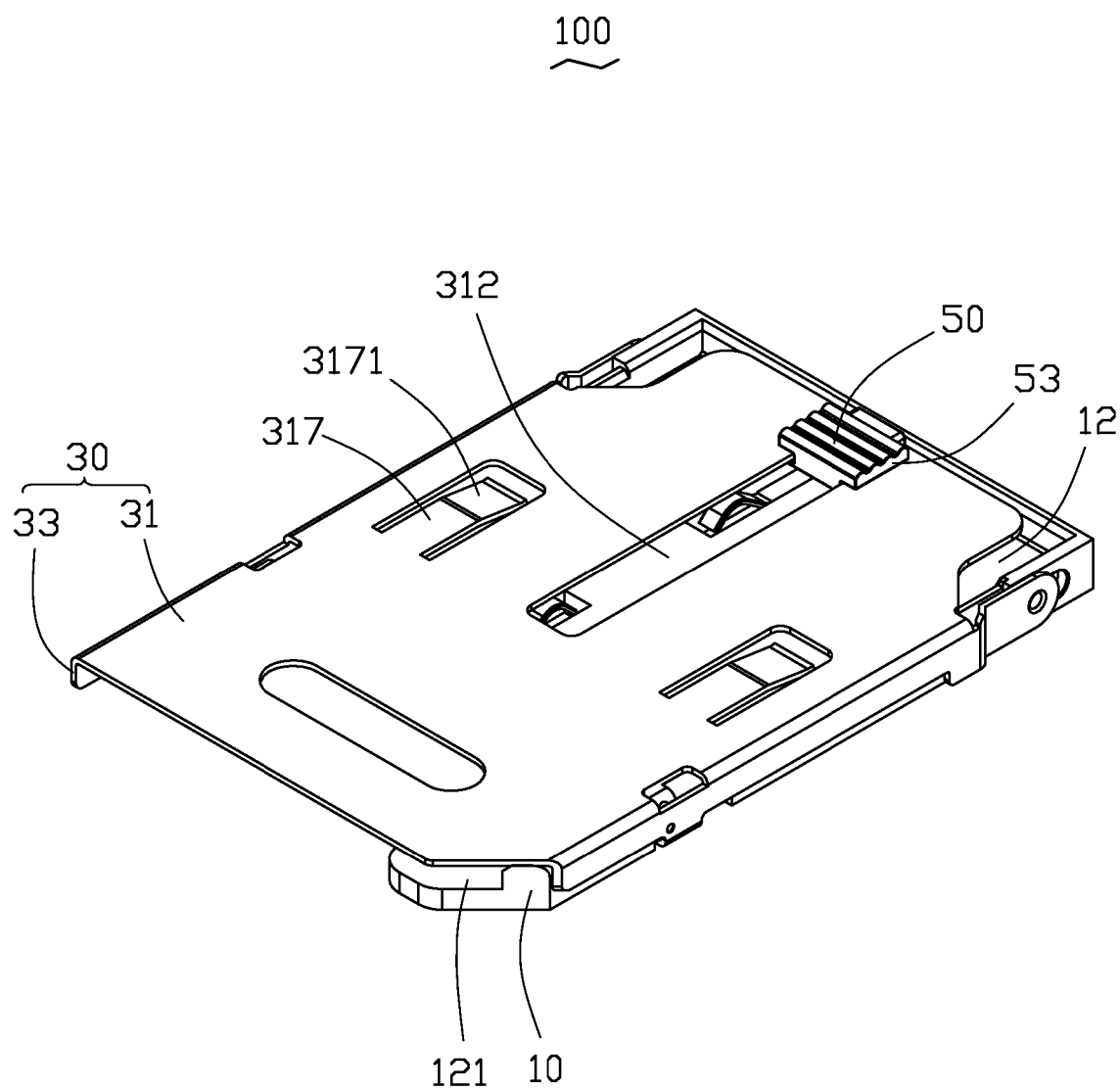
FIG. 3 is an assembled view of the surface contact card holder of FIGS. 1 and 2 with no surface contact card in place.

During assembly, referring to FIG. 3, the impeller 50 is slidably received in the opening 312 of the cover 30 through the slot 55. Cover 30 with the impeller 50 is positioned above the main body 10. The tab 333 is received in the slot 31, and the stopper block 336 is engaged the guide groove 16. The post 338 is latched in the through hole 18. Accordingly, the cover 30 is fixed to the main body 10. The contact portion 52 resists the main body 10.

Figure 4:
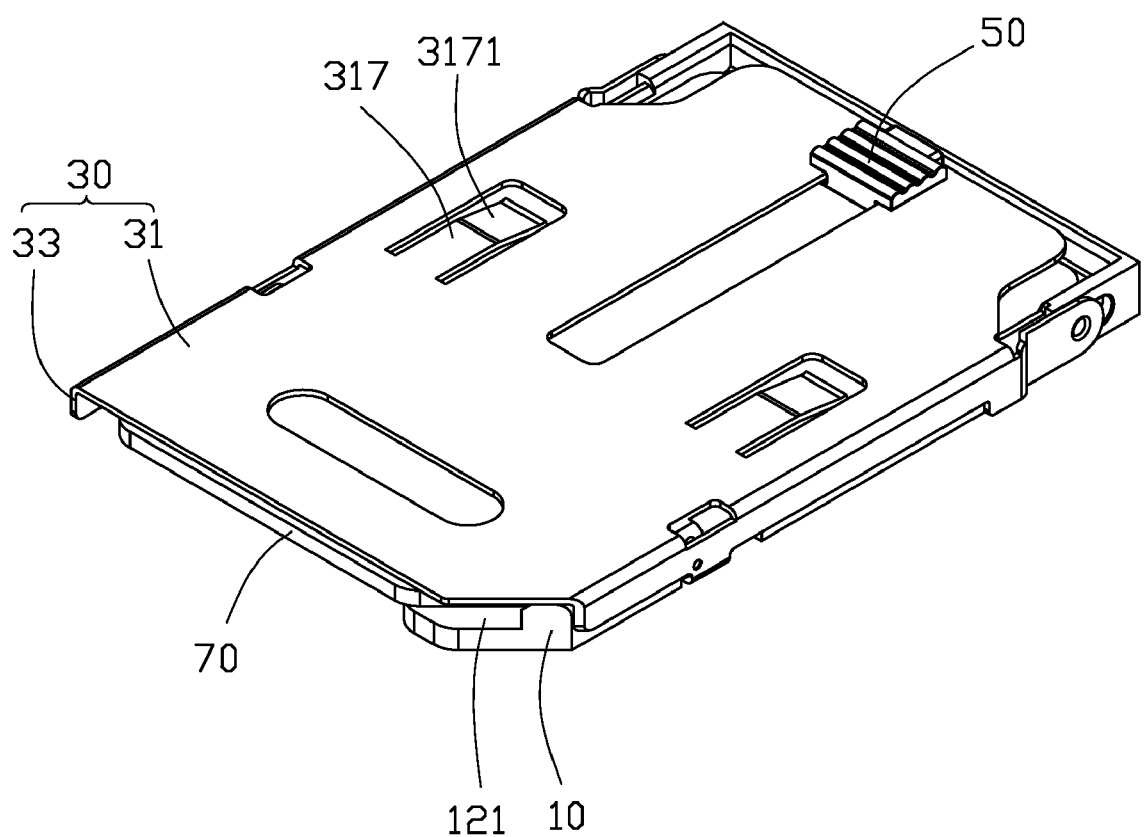
FIG. 4 is an assembled view of the surface contact card holder of the exemplary embodiment, with the surface contact card in place.
Figure 5:
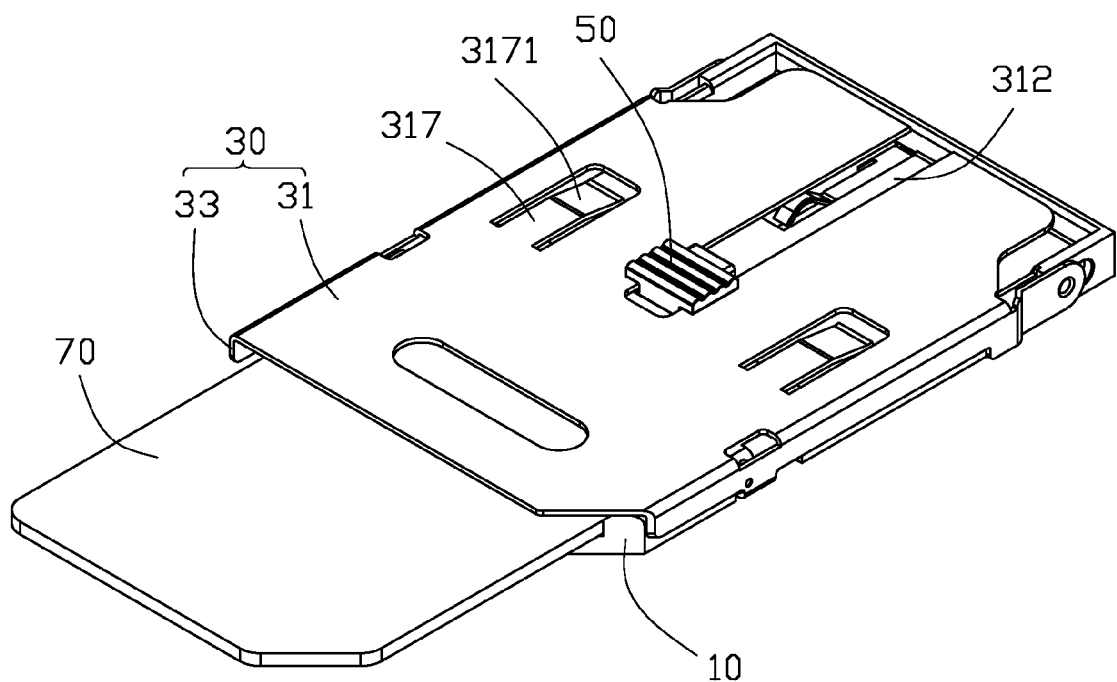
FIG. 5 is a schematic view of the surface contact card holder showing disengagement of the surface contact card.

In use, referring to FIGS. 4 and 5, the surface contact card 70 is taken here as an exemplary application for the purposes of describing details of the surface contact holder 100. The surface contact card 70 is inserted into the receiving bay 12 along the open end 121. The bent ends 3171 of the resisting portions 317 of the cover 30 are pushed upward until the surface contact card 70 is completely received in the receiving bay 12. The bent ends 3171 provide force to tightly press the surface contact card 70 toward the connector 15. The surface contact card 70 is thereby held steadily in the main body 10. After the surface contact card 70 is inserted, the impeller 50 resists one end thereof.

To remove the surface contact card 70, the impeller 50 is slid toward the open end 121, and surface contact card 70 is easily ejected from the receiving bay 12.

Alternatively, the impeller 50 may be replaced with other equally applicable structures. Further, cover 30 may be fixed to the main body 10 by welding.

Advantages of the surface contact card holder include secure connection with contact members as well as dependable containment of the card in the receiving bay, by means of the resisting portion. Operation of the impeller provides easy removal of the contact card. Therefore, the surface contact card holder offers both simplicity and ease of use.

It is believed that the present embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

What is claimed is:

1. A holder for a surface contact card, comprising:
    a main body providing a receiving bay receiving the surface contact card therein;
    a cover disposed on the main body and defining an opening, wherein the cover includes a baseboard defining a cutout and a resisting portion extending thereinto, the resisting portion pressing the surface contact card; and
    an impeller slidably received in the opening for moving the surface contact card out of the receiving bay.

2. The holder as claimed in claim 1, wherein each resisting portion has a bent end angling toward an inner side of the baseboard.

3. The holder as claimed in claim 1, wherein the impeller includes a main portion and a contact portion integrally formed together, and one side of the main portion forms a plurality of ribs.

4. The holder as claimed in claim 3, wherein the main portion defines two slots at two sides thereof, slidably receiving the cover.

5. The holder as claimed in claim 4, wherein the contact portion is positioned at one end of the main portion, and one side of the contact portion is higher than the main portion.

6. The holder as claimed in claim 1, wherein the main body includes two sidewalls and one end wall connecting each other, thereby defining the receiving bay, each sidewall respectively defining a notch, a guide groove, and a through hole.

7. The holder as claimed in claim 6, wherein the cover includes two extending boards, each forming a tab, a stopper block, and a post respectively corresponding to the notch, the guide groove and the through hole.

8. A portable electronic device comprising a holder for a surface contact card, the holder mounted on the portable electronic device and comprising:
    a main body providing a receiving bay receiving the surface contact card therein;
    a cover partially enclosing the receiving bay of the main body to retain the contact surface card therein; and
    an impeller slidably set on the cover, the impeller including a main portion and a contact portion integrally formed together, the contact portion pushing the surface contact card out of the receiving bay.

9. The portable electronic device as claimed in claim 8, wherein one side of the main portion forms a plurality of ribs.

10. The portable electronic device as claimed in claim 9, wherein the main portion defines two slots at two sides thereof, slidably receiving the cover.

11. The portable electronic device as claimed in claim 10, wherein the contact portion is positioned at one end of the main portion, and one side of the contact portion is higher than the main portion.

12. The portable electronic device as claimed in claim 8, wherein the cover includes a baseboard, defining a cutout and a resisting portion extending thereinto, and the resisting portion presses the surface contact card.

13. The portable electronic device as claimed in claim 12, wherein each resisting portion has a bent end angling toward an inner side of the baseboard.

* * * * *